United States Patent
Kimura et al.

(10) Patent No.: US 7,904,075 B2
(45) Date of Patent: Mar. 8, 2011

(54) COMMUNICATION METHOD, COMMUNICATION SYSTEM, AND COMMUNICATION APPARATUS

(75) Inventors: Youichi Kimura, Tama (JP); Katsuhiko Sukegawa, Tama (JP)

(73) Assignee: Mitsumi Electric Co., Ltd., Tokyo (JP)

(*) Notice: Subject to any disclaimer, the term of this patent is extended or adjusted under 35 U.S.C. 154(b) by 583 days.

(21) Appl. No.: 11/703,385

(22) Filed: Feb. 7, 2007

(65) Prior Publication Data

US 2007/0188340 A1  Aug. 16, 2007

(30) Foreign Application Priority Data

Feb. 15, 2006 (JP) ................. 2006-038663

(51) Int. Cl.
*H04M 3/00* (2006.01)
*H04B 1/38* (2006.01)
(52) U.S. Cl. .............. 455/420; 455/574; 340/7.35
(58) Field of Classification Search .............. None
See application file for complete search history.

(56) References Cited

U.S. PATENT DOCUMENTS

| | | | |
|---|---|---|---|
| 4,996,526 A * | 2/1991 | DeLuca | 340/7.35 |
| 5,299,117 A | 3/1994 | Farnbach | |
| 5,797,132 A | 8/1998 | Altwasser | |
| 6,072,987 A * | 6/2000 | Willey | 340/7.43 |

FOREIGN PATENT DOCUMENTS

| | | |
|---|---|---|
| JP | 9-138892 | 5/1997 |
| JP | 2002-109177 | 4/2002 |
| JP | 2002-525903 A | 8/2002 |
| JP | 2002-304673 | 10/2002 |
| JP | 2004-265196 | 9/2004 |
| JP | 2005-99888 | 4/2005 |
| JP | 2005-130436 A | 5/2005 |
| WO | 90/06566 A1 | 6/1990 |
| WO | 00/16491 A1 | 3/2000 |

OTHER PUBLICATIONS

European Search Report: 07250473.1-1246/1821419.

* cited by examiner

*Primary Examiner* — Erika A Gary
(74) *Attorney, Agent, or Firm* — Ladas & Parry LLP

(57) ABSTRACT

There is disclosed a communication method of a communication system having a base station for transmitting a beacon and a terminal for receiving the beacon transmitted from the base station and performing communication with the base station, the communication method including the steps of: transmitting the beacon by the base station, the beacon being made of a plurality of sub-beacons including an ID for identifying the terminal; and stopping processing for communication with the base station by the terminal when at least one of the plural sub-beacons has a portion that does not match an ID of the terminal.

6 Claims, 7 Drawing Sheets

FIG.7

| CALL ID INFORMATION | SUB-BEACON sbn1 | SUB-BEACON sbn2 | SUB-BEACON sbn3 | SUB-BEACON sbn4 | SUB-BEACON sbn5 | SUB-BEACON sbn6 |
|---|---|---|---|---|---|---|
| CALL ID INFORMATION #0 | 0000001 | 0000001 | 0000001 | 0000001 | 0000001 | 000001 |
| CALL ID INFORMATION #1 | 0000000 | 0000000 | 0000001 | 0000000 | 0000000 | 000000 |
| CALL ID INFORMATION #2 | 0000011 | 0000011 | 0000011 | 0000011 | 0000011 | 000011 |
| CALL ID INFORMATION #3 | 0000111 | 0000111 | 0000111 | 0000111 | 0000111 | 000111 |
| CALL ID INFORMATION #4 | 1000000 | 1000000 | 1000000 | 1000000 | 1000000 | 010001 |
| CALL ID INFORMATION #5 | 1100001 | 1100001 | 1100111 | 1100001 | 1100001 | 011001 |
| CALL ID INFORMATION #6 | 1110001 | 1110001 | 1110001 | 1110001 | 1110001 | 111001 |
| CALL ID INFORMATION #7 | 1100001 | 1100001 | 1100001 | 1100001 | 1100001 | 011001 |

COMMUNICATION METHOD, COMMUNICATION SYSTEM, AND COMMUNICATION APPARATUS

The present application is based on Japanese priority application No. 2006-038663 filed Feb. 15, 2006, the entire contents of which are hereby incorporated herein by reference.

BACKGROUND OF THE INVENTION

1. Field of the Invention

The present invention generally relates to a communication method, a communication system, and a communication apparatus and particularly to a communication method, a communication system, and a communication apparatus in a communication system having a base station for transmitting a beacon and a terminal for performing communication with the base station.

2. Description of the Related Art

In an electronic shelf label system, an electronic shelf label having rewritable display information is registered in a host computer and then attached to a product shelf. It is possible to rewrite the display information of the electronic shelf label from the host computer by accessing the electronic shelf label through an access point (refer to Patent Documents 1 to 5).

Such an electronic shelf label system employs a communication method such as IEEE 802.15.4 or the like, in which a beacon periodically transmitted by a coordinator is used as a standard and each node performs transmission and reception processing. In this communication method, when the coordinator is to transmit data to a certain node, an ID of the node is inserted into a beacon.

Each node that receives a beacon return a response when the ID included in the beacon corresponds to its own ID. When the ID included in the beacon does not correspond to its own ID, the node ends reception processing and enters a sleep mode.

Patent Document 1: Japanese Laid-Open Patent Application No. 2002-304673
Patent Document 2: Japanese Laid-Open Patent Application No. 2005-99888
Patent Document 3: Japanese Laid-Open Patent Application No. 2002-109177
Patent Document 4: Japanese Laid-Open Patent Application No. 2004-265196
Patent Document 5: Japanese Laid-Open Patent Application No. 9-138892

In a conventional communication method, in proportion as a period of time from beacon reception to sleep mode based on a judgment that the received beacon is not addressed to the node is reduced, lower power consumption is realized. However, when the number of nodes is increased and the number of bits of ID is increased, this poses problems in that power consumption is increased, for example.

SUMMARY OF THE INVENTION

It is a general object of the present invention to provide an improved and useful communication method, communication system, and communication apparatus in which the above-mentioned problems are eliminated.

A more specific object of the present invention is to provide a communication method, communication system, and communication apparatus that can realize low power consumption.

According to one aspect of the present invention, there is provided a communication method of a communication system having a base station for transmitting a beacon and a terminal for receiving the beacon transmitted from the base station and performing communication with the base station, the communication method including the steps of: transmitting the beacon by the base station, the beacon being made of a plurality of sub-beacons including an ID for identifying the terminal; and stopping processing for communication with the base station by the terminal when at least one of the plural sub-beacons has a portion that does not match an ID of the terminal.

According to another aspect of the present invention, in the communication method of a communication system, the terminal shifts an operation status of the terminal to a power saving status when at least one of the plural sub-beacons has a portion that does not match the ID of the terminal.

According to another aspect of the present invention, there is provided a communication system including: a base station for transmitting a beacon; and a terminal for receiving the beacon transmitted from the base station and performing communication with the base station, wherein the base station divides the beacon into a plurality of sub-beacons including an ID for identifying the terminal and transmits the plural sub-beacons, and the terminal stops processing for communication with the base station when at least one of the plural sub-beacons has a portion that does not match an ID of the terminal.

According to another aspect of the present invention, in the communication system, the terminal shifts an operation status of the terminal to a power saving status when at least one of the plural sub-beacons has a portion that does not match the ID of the terminal.

According to another aspect of the present invention, there is provided a communication apparatus for transmitting a beacon and receiving a response to the beacon from a terminal, the communication apparatus including: a communication unit transmitting the beacon and receiving the response from the terminal; and a process unit generating the beacon from a plurality of sub-beacons including an ID for identifying the terminal and transmitting the beacon from the communication unit.

According to another aspect of the present invention, there is provided a communication apparatus for receiving a beacon made of a plurality of sub-beacons including an ID from a base station and returning a response to the base station, the communication apparatus including: a communication unit receiving the beacon from the base station and transmitting the response to the base station; and a process unit shifting an operation status of the communication apparatus to a power saving status when at least one of the plural sub-beacons has a portion that does not match the ID of the communication apparatus.

According to the present invention, a beacon made of plural sub-beacons including an ID for identifying a terminal is transmitted from a base station. And the terminal stops communication with the base station when at least one of the plural sub-beacons has a portion that does not match an ID of the terminal. In accordance with this, when a response request is not intended for the terminal, the terminal stops communication processing even when the beacon is being transmitted, so that it is possible to reduce power consumption without wasting unnecessary power.

Other objects, features and advantage of the present invention will become more apparent from the following detailed description when read in conjunction with the accompanying drawings.

BRIEF DESCRIPTION OF THE DRAWINGS

FIG. 7 is a diagram showing a structure of a beacon in an example according to the present invention.

DETAILED DESCRIPTION OF THE PREFERRED EMBODIMENTS

[System Configuration]

Figure 1:
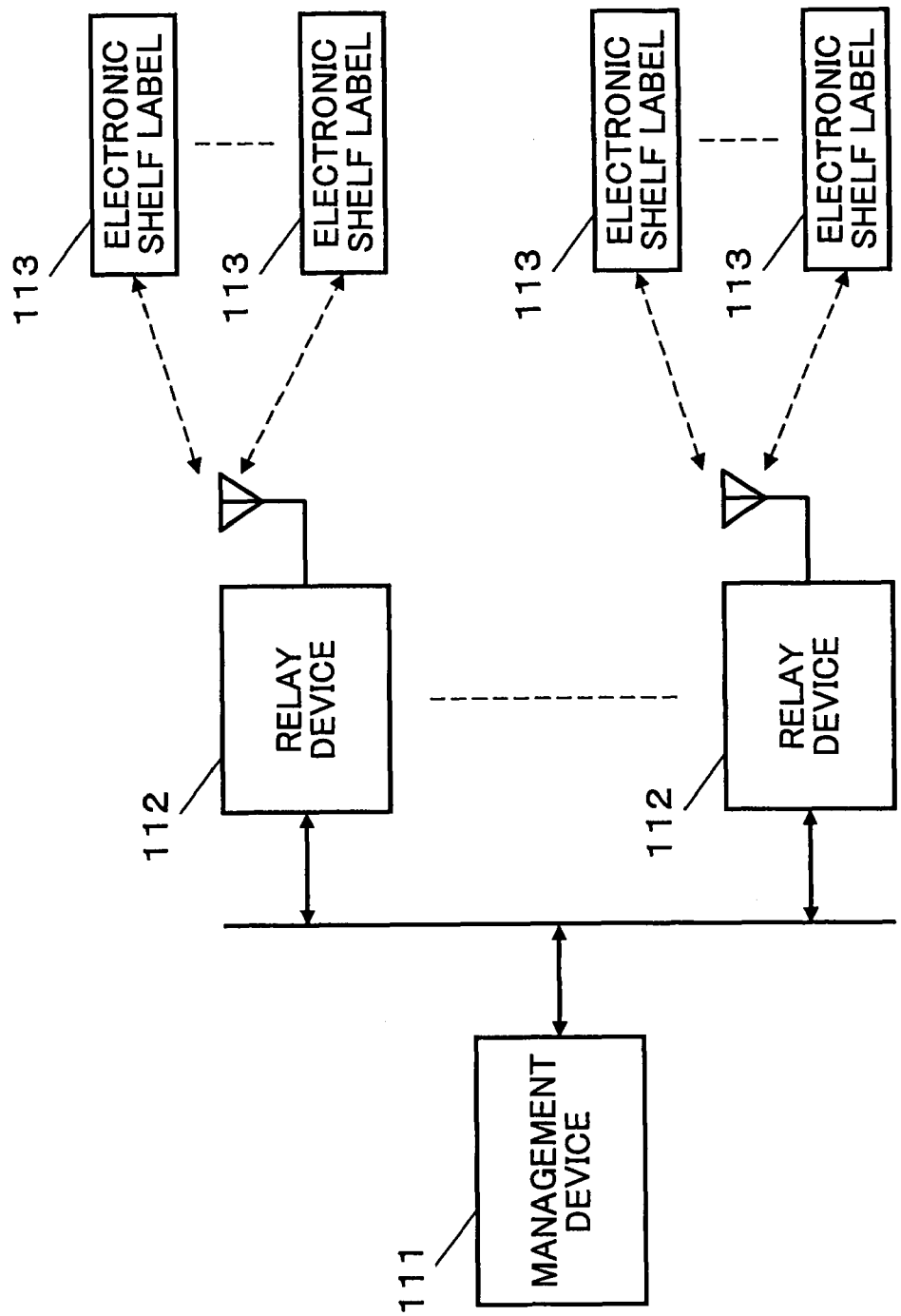
FIG. 1 is a configuration diagram of an example of a system according to the present invention.

FIG. 1 is a configuration diagram of an example of a system according to the present invention.

An electronic shelf label system 100 according to the example includes a management device 111, a relay device 112, and an electronic shelf label 113. The electronic shelf label system 100 has the relay device 112 for relaying communication between the electronic shelf label 113 and the management device 111 managing the electronic shelf label 113 and manages the electronic shelf label 113 attached to a product shelf.

Examples of a radio communication method between the relay device 112 and the electronic shelf label 113 include IEEE 802.15.4 or the like, in which a beacon periodically transmitted by the relay device 112 is used as a standard and each electronic shelf label 113 performs transmission and reception processing.

[Relay Device]

Figure 2:
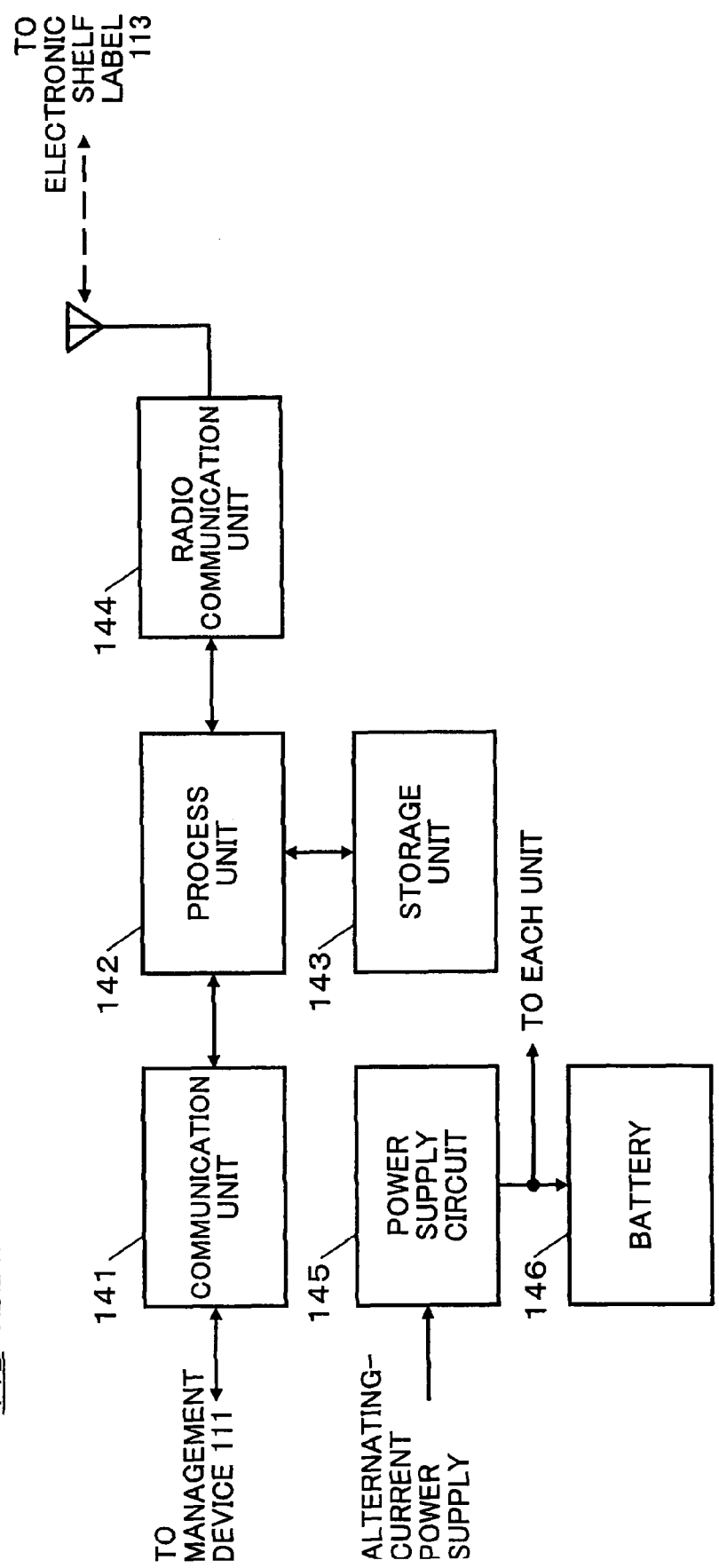
FIG. 2 is a block diagram of a relay device.

FIG. 2 is a block diagram of the relay device 112.

The relay device 112 includes a communication unit 141, a process unit 142, a storage unit 143, a radio communication unit 144, a power supply circuit 145, and a battery 146.

The communication unit 141 is connected to the management device 111 via a network such as LAN, WAN, a dedicated line, or the like. The communication unit 141 performs communication with the management device 111.

The process unit 142 includes a microcomputer and the like and performs processing for relaying communication, for example, between the management device 111 and the electronic shelf label 113 based on a program installed on the storage unit 143.

The storage unit 143 includes a rewritable non-volatile memory such as EEPROM, for example, ROM, RAM, and the like. In the storage unit 143, information 131 on electronic shelf labels within a communication range is stored in addition to a communication control program.

The radio communication unit 144 performs radio communication with the electronic shelf label 113.

The power supply circuit 145 is connected to an alternating-current power supply such as an external commercial power supply. The power supply circuit 145 converts the connected alternating-current power into a direct-current voltage and supplies the direct-current voltage as a driving voltage to the communication unit 141, the process unit 142, the storage unit 143, and the radio communication unit 144.

The battery 146 includes a Ni—Cd battery, a lithium ion battery, an electric double layer capacitor, or the like as a chargeable battery unit. The battery 146 is charged from the direct-current voltage generated in the power supply circuit 145 and supplies electric power for driving the communication unit 141, the process unit 142, the storage unit 143, and the radio communication unit 144 for a certain period of time so as to execute an end program when alternating-current power is cut.

[Electronic Shelf Label]

Figure 3:
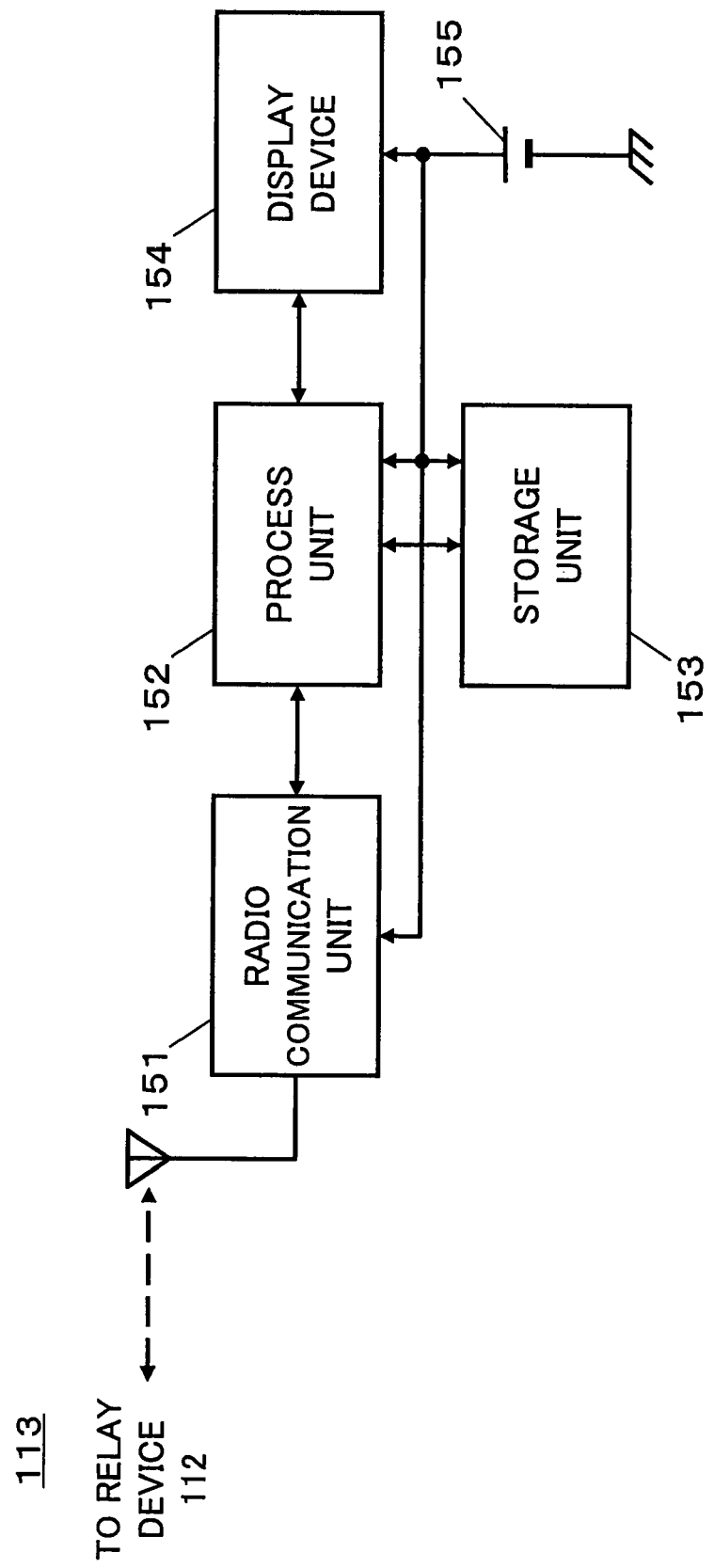
FIG. 3 is a block diagram of an electronic shelf label.

FIG. 3 is a block diagram of the electronic shelf label 113.

The electronic shelf label 113 includes a radio communication unit 151, a process unit 152, a storage unit 153, a display device 154, and a battery 155.

The radio communication unit 151 performs radio communication with the relay device 112.

The process unit 152 includes CPU, for example. The process unit 152 controls communication with the relay device 112 and also controls display of the display device 154 based on a program stored in the storage unit 153.

The storage unit 153 includes a rewritable non-volatile storage device such as EEPROM, for example. In the storage unit 153, a program executed in the process unit 152 is installed and shelf label IDs and product codes are stored. Some of the shelf label IDs and product codes are registered in advance and can be changed by the relay device 112.

The display device 154 includes LCD, an EL panel, electronic paper, or the like. The display device 154 displays product names, product codes, prices and the like.

The battery 155 includes a small battery and supplies electric power for driving the radio communication unit 151, the process unit 152, the storage unit 153, and the display device 154.

[Operation]

First, a beacon transmission operation of the relay device 112 is described.

Figure 4:
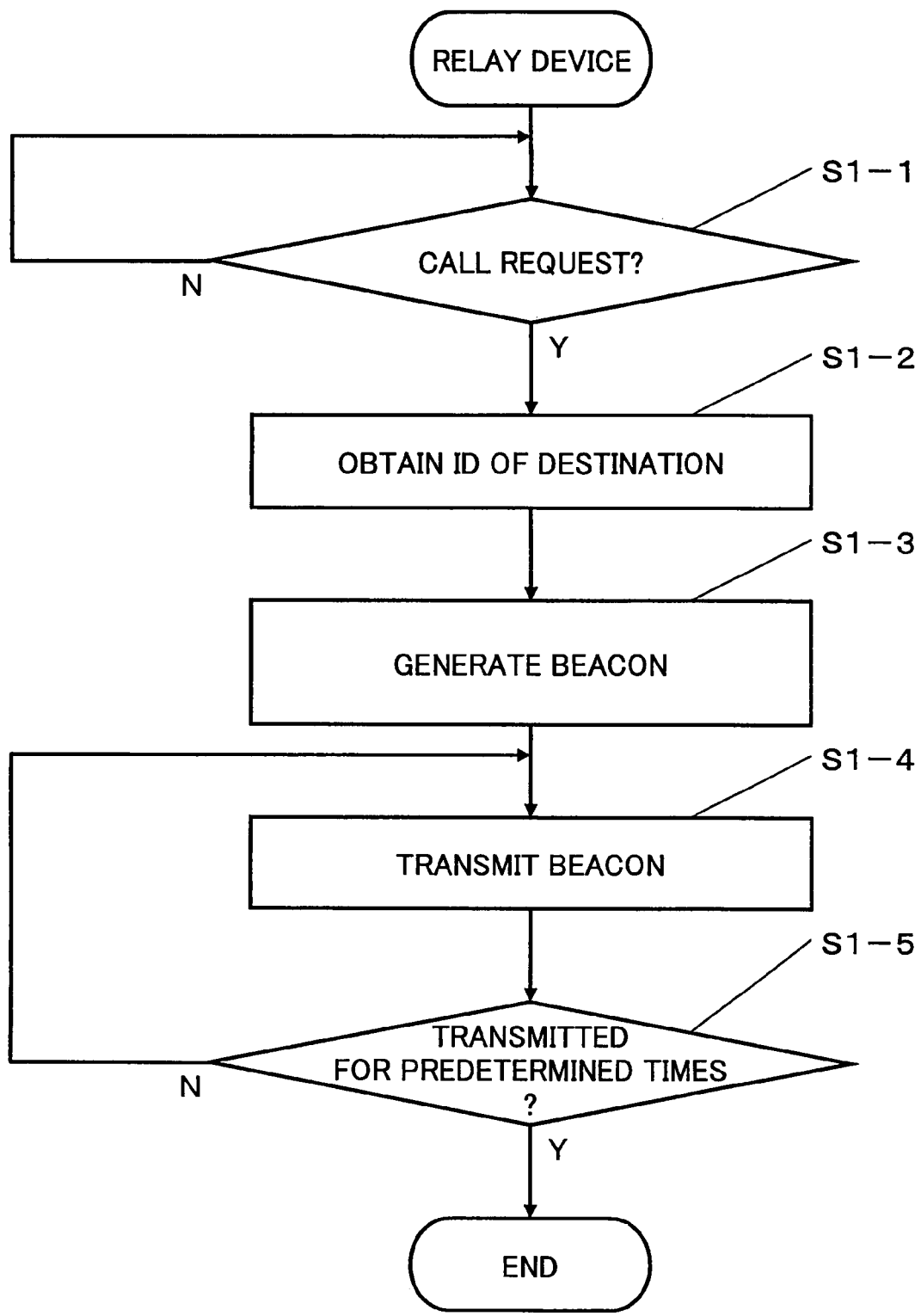
FIG. 4 is a process flow chart of a relay device.

FIG. 4 is a process flow chart of the relay device 112.

When a request for calling the electronic shelf label 113 is issued in step S1-1, the process unit 142 of the relay device 112 obtains an ID of a calling destination in step S1-2. Next, the process unit 142 generates a beacon based on the obtained ID of the calling destination in step S1-3.

The process unit 142 transmits the generated beacon from radio communication unit 144 in step S1-4. The process unit 142 transmits the beacon at predetermined times in step S1-5 and ends the calling.

Figure 5:
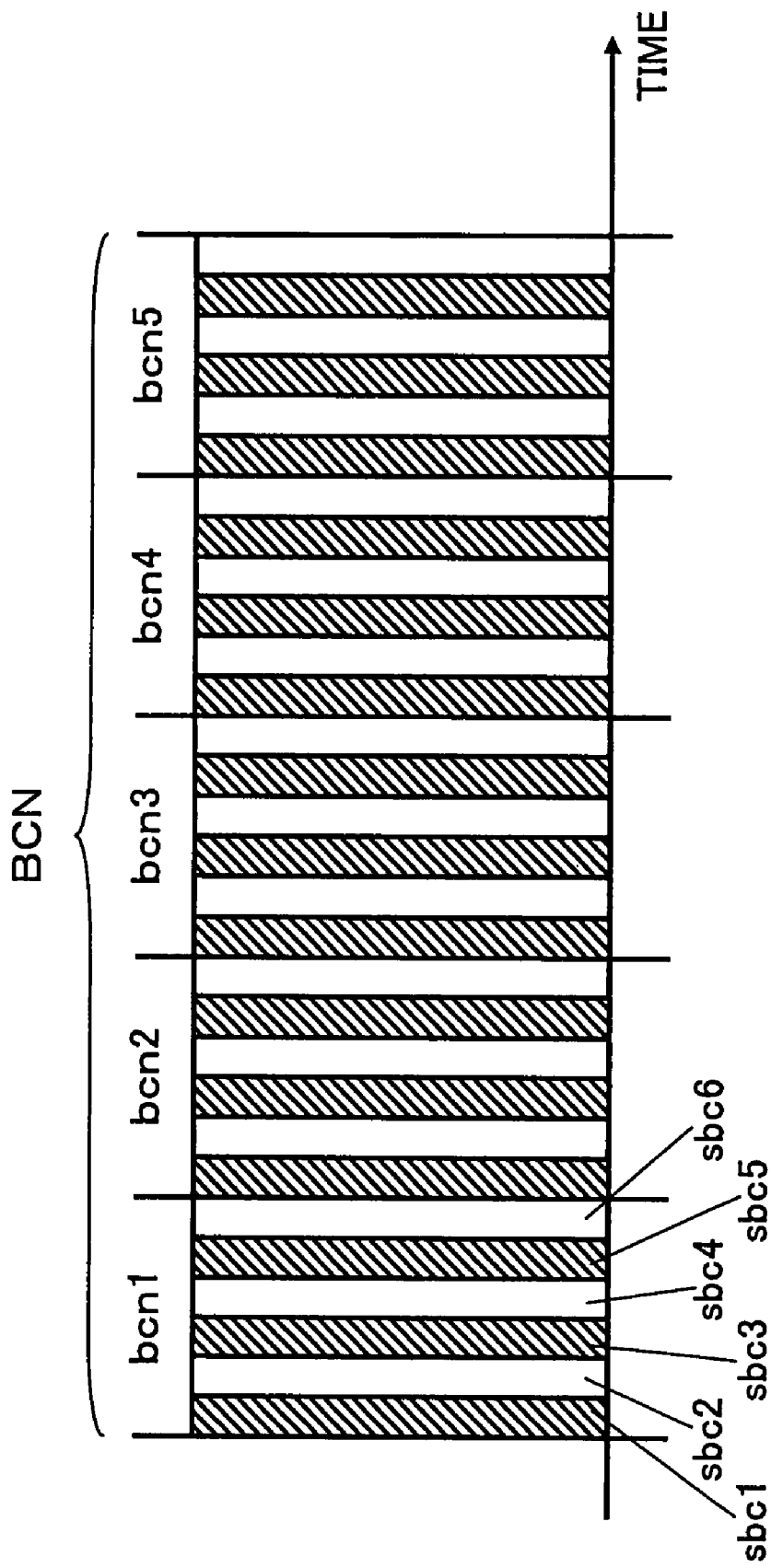
FIG. 5 is a diagram illustrating a call operation by a relay device.

FIG. 5 is a diagram illustrating a call operation by the relay device 112.

A call signal BCN for calling by the relay device 112 is made of plural beacons bcn 1 to bcn 5 as shown in FIG. 5. The plural beacons bcn 1 to bcn 5 are made of the same signal. Each of the plural beacons bcn 1 to bcn 5 is made of plural sub-beacons sbc 1 to sbc 6. The ID of the calling destination is divided into plural sub-beacons sbc 1 to sbc 6.

Next, a response operation in the electronic shelf label 113 is described.

Figure 6:
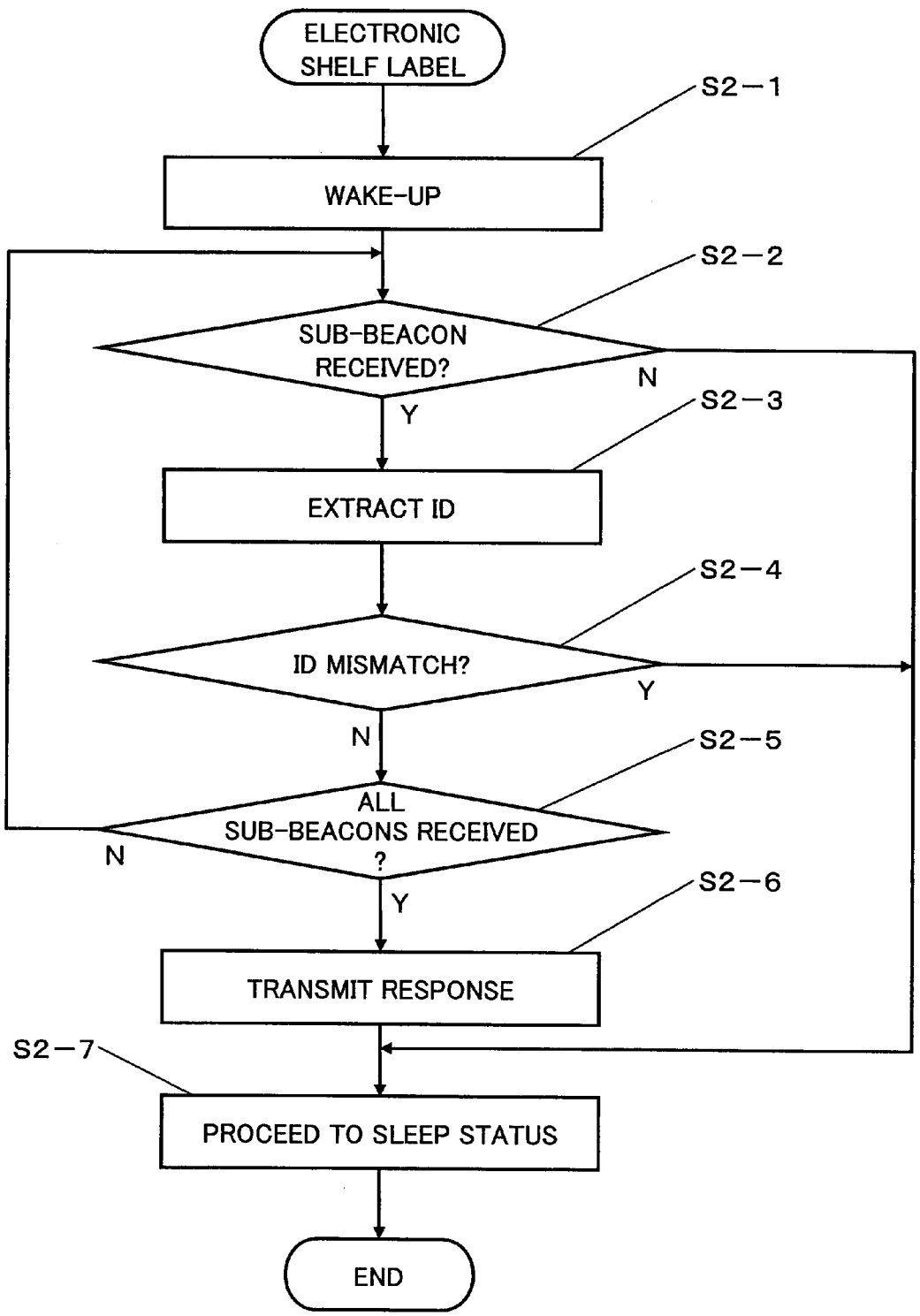
FIG. 6 is a diagram illustrating an operation of an example according to the present invention.

FIG. 6 is a process flow chart of a response operation of the electronic shelf label 113.

When the process unit 152 of the electronic shelf label 113 wakes up in step S2-1, namely, shifts to a normal operation status, first, the process unit 152 determines whether a beacon is received from the relay device 112 in step S2-2.

When a sub-beacon is received in step S2-2, the process unit 152 extracts a divided ID allocated to the received sub-beacon in step S2-3.

The process unit 152 determines whether the divided ID matches a corresponding portion of own ID stored in the storage unit 153 in step S2-4. When the divided ID does not match the corresponding portion of own ID in step S2-4, it is possible to determine that calling is not intended for the electronic shelf label 113, so that the process unit 152 shifts an operation status to a sleep status so as to stop operations other than a necessary portion.

Further, when the divided ID matches the corresponding portion of own ID in step S2-4, the process unit 152 determines whether all sub beacons are received in step S2-5.

When all sub beacons are yet to be received in step S2-5, the process returns to step S2-2, where the process unit 152 continues the reception of sub-beacons from the relay device 112.

Further, when all sub-beacons are received in step S2-5, the process unit 152 transmits information as a response in accordance with calling from the relay device 112 in a predetermined communication slot in step S2-6. After the response is transmitted, the process unit 152 shifts the operation status to a sleep status in step S2-7.

In the following, a more specific example is considered based on a case where one beacon is divided into six sub-beacons as shown in FIG. 5. One beacon is capable of storing a 64-bit ID. One sub-beacon is capable of storing an ID obtained by dividing the 64-bit ID into an 8-bit ID.

The process unit 152 of the electronic shelf label 113 determines whether own ID is included upon each reception of sub-beacons. The relay device 112 repeatedly transmits the beacon made of six sub-beacons. In FIG. 5, the beacon is transmitted five times.

In this manner, since the same beacon is transmitted five times, it is possible to readily receive the beacon even when the electronic shelf label 113 has poor accuracy of wake-up timing.

Next, a method for determining matching/mismatching in the electronic shelf label 113 is described in detail.

FIG. 7 is a diagram showing a structure of a beacon in an example according to the present invention.

In the following, X indicates a bit column that is not received. { } indicates matching and [ ] indicates mismatching.

Description below is based on a case where a beacon as shown in FIG. 7 is transmitted from the relay device 112 and the electronic shelf label 113 starts reception from a first sub-beacon sbc 2.

The process unit 152 wakes up using a timer at a beacon transfer time. Thereafter, the process unit 152 receives the sub-beacon sbc 2 and compares it with eight sets of call ID information. As a result, two portions of call ID information are matched.

Identification number of the electronic shelf label 113:
1111101:{1100001}:1100111:1101001:1101101:011000
Call ID information #5:
XXXXXXX:{1100001}:XXXXXXX:XXXXXXX:
XXXXXXX:XXXXXX
Call ID information #7:
XXXXXXX:{1100001}:XXXXXXX:XXXXXXX:
XXXXXXX:XXXXXX The process unit 152 receives the sub-beacon sbc 3 and compares it with two sets of call ID information #5 and #7. As a result, one portion of call ID information is matched.
Identification number of the electronic shelf label 113:
1111101:{1100001}:1100111:1101001:1101101:011000
Call ID information #5:
XXXXXXX:{1100001}:{1100111}:XXXXXXX:
XXXXXXX:XXXXXX
Call ID information #7:
XXXXXXX:{1100001}:[1100001]:XXXXXXX:
XXXXXXX:XXXXXX The process unit 152 receives the sub-beacon sbc 4 and compares it with one set of call ID information #5. As a result, no portion is matched.
Identification number of the electronic shelf label 113:
1111101:{1100001}:1100111:1101001:1101101:011000
Call ID information #5:
XXXXXXX:{1100001}:{110011}:[1100001]:
XXXXXXX:XXXXXX In this case, the process unit 152 determines that the calling is not intended for the electronic shelf label 113 and sets the timer such that the process unit 152 wakes up at the next beacon transfer time, and then the process unit 152 enters a sleep status.

Next, a case where the electronic shelf label 113 starts reception from the sub-beacon sbc 3 is described.

The process unit 152 wakes up at the beacon transfer time. Thereafter, the process unit 152 receives the sub-beacon sbc 3 and compares it with eight sets of call ID information. As a result, one portion of call ID information is matched.

Identification number of the electronic shelf label 113:
0000000:0000000:0000000:0000000:0000000:000000
Call ID information #1:
XXXXXXX:XXXXXXX:{0000000}:XXXXXXX:
XXXXXXX:XXXXXX The process unit 152 receives the sub-beacon sbc 4 and compares it with one set of call ID information #1. As a result, the portion is matched.
Identification number of the electronic shelf label 113:
0000000:0000000:0000000:0000000:0000000:000000
Call ID information #1:
XXXXXXX:XXXXXXX:{0000000}:{0000000}:
XXXXXXX:XXXXXX The process unit 152 receives the sub-beacon sbc 5 and compares it with one set of call ID information #1. As a result, the portion is matched.
Identification number of the electronic shelf label 113:
0000000:0000000:0000000:0000000:0000000:000000
Call ID information #1:
XXXXXXX:XXXXXXX:{0000000}:{0000000}:
{0000000}:XXXXXX The process unit 152 receives the sub-beacon sbc 6 and compares it with one set of call ID information #1. As a result, the portion is matched.
Identification number of the electronic shelf label 113:
0000000:0000000:0000000:0000000:0000000:000000
Call ID information #1:
XXXXXXX:XXXXXXX:{0000000}:{0000000}:
{0000000}:{000000}

The process unit 152 receives the sub-beacon sbc 1 and compares it with one set of call ID information #1. As a result, the portion is matched.
Identification number of the electronic shelf label 113:
0000000:0000000:0000000:0000000:0000000:000000
Call ID information #1:
{0000000}:XXXXXXX:{0000000}:{0000000}:
{0000000}:{000000}

The process unit 152 receives the sub-beacon sbc 2 and compares it with one set of call ID information #1. As a result, the portion is matched.
Identification number of the electronic shelf label 113:
0000000:0000000:0000000:0000000:0000000:000000
Call ID information #1:
{0000000}:{0000000}:{0000000}:{0000000}:{0000000}:
{000000}

In accordance with this, the process unit 152 receives six different sub-beacons and the identification number of the shelf label is included, so that the process unit 152 determines that the electronic shelf label 113 is called.

The ID of the electronic shelf label 113 is stored in the call ID information #1, so that communication with a base station is performed in a communication slot in a frame following the beacon. Thus, the process unit 152 enters a sleep status until the next communication slot time.

The process unit 152 of the electronic shelf label 113 wakes up at the communication slot time and performs communication with the relay device 112. When the communication with the relay device 112 is ended, the process unit 152 of the electronic shelf label 113 enters a sleep status until the next beacon transfer time.

[Effects]

According to the present example, the beacon is transmitted as plural sub-beacons, so that it is not necessary to receive all beacons when the electronic shelf label is not called. Accordingly, it is possible to reduce a time for checking radio waves, namely, a length of time in which a communication circuit is switched on for reception, thereby realizing low power consumption.

Further, since the same beacon is repeatedly transmitted, it is possible to readily receive the beacon even when the electronic shelf label has poor accuracy of wake-up timing. Accordingly, it is possible to use an inexpensive element as a timer for waking-up in synchronization with the beacon and to manufacture the electronic shelf label 113 in an inexpensive manner.

According to the present example, the electronic shelf label 113 is capable of reducing an unnecessary reception period, so that it is possible to realize low power consumption.

The present invention is not limited to the specifically disclosed embodiment, and variations and modifications may be made without departing from the scope of the present invention.

What is claimed is:

1. A communication method of a communication system having a base station for transmitting a beacon and a terminal for receiving the beacon transmitted from the base station and performing communication with the base station, the communication method comprising the steps of:
   transmitting the same beacon repeatedly by the base station, the beacon being made of a plurality of sub-beacons to which a divided ID is allocated, the ID identifying the terminal; and
   stopping processing for communication with the base station by the terminal when at least one of the plural sub-beacons has a portion that does not match a corresponding portion of an ID of the terminal during a comparison of the ID and the sub-beacons,
   wherein each divided ID of the sub-beacons has an equal bit number and the terminal starts reception and comparison from any of the sub-beacons.

2. The communication method according to claim 1, wherein
   the terminal shifts an operation status of the terminal to a power saving status when at least one of the plural sub-beacons has a portion that does not match the ID of the terminal.

3. A communication system comprising:
   a base station for transmitting repeatedly a beacon; and
   a terminal for receiving the beacon transmitted from the base station and performing communication with the base station, wherein
   the base station divides the beacon into a plurality of sub-beacons, each including an ID identifying the terminal, and transmits the plural sub-beacons, and
   the terminal stops processing for communication with the base station when at least one of the plural sub-beacons has a portion that does not match a corresponding portion of an ID of the terminal during a comparison of the ID and the sub-beacons,
   wherein each ID of the sub-beacons has an equal bit number and the terminal starts reception and comparison from any of the sub-beacons.

4. The communication system according to claim 3, wherein
   the terminal shifts an operation status of the terminal to a power saving status when at least one of the plural sub-beacons has a portion that does not match the ID of the terminal.

5. A communication apparatus for transmitting a beacon and receiving a response to the beacon from a terminal, the communication apparatus comprising:
   a communication unit transmitting repeatedly the same beacon to the terminal and receiving the response from the terminal; and
   a process unit generating the beacon from a plurality of sub-beacons, each of the sub-beacons including an ID identifying the terminal, and transmitting the beacon from the communication unit,
   wherein when at least one of the plurality of sub-beacons has a portion that does not match a corresponding portion of an ID of the terminal during a comparison of the ID and the sub-beacons, the terminal stops communication with the communication unit, and
   wherein each ID of the sub-beacons has an equal bit number and the terminal starts reception and comparison from any of the sub-beacons.

6. A communication apparatus for receiving a beacon made of a plurality of sub-beacons each including an ID from a base station and returning a response to the base station, the communication apparatus comprising:
   a communication unit receiving the beacon from the base station and transmitting the response to the base station; and
   a process unit shifting an operation status of the communication apparatus to a power saving status when at least one of the plural sub-beacons has a portion that does not match a corresponding portion of an ID of the communication apparatus during a comparison of the ID and the sub-beacons,
   wherein each ID of the sub-beacons has an equal bit number and the communication unit starts reception and the process unit starts comparison from any of the sub-beacons.

* * * * *